US006634281B1

United States Patent
Conigliaro

(10) Patent No.: US 6,634,281 B1
(45) Date of Patent: Oct. 21, 2003

(54) ROTISSERIE ATTACHABLE SKEWER ASSEMBLY

(76) Inventor: Paul G. Conigliaro, 236 W. 68th St., Long Beach, CA (US) 90805

( * ) Notice: Subject to any disclaimer, the term of this patent is extended or adjusted under 35 U.S.C. 154(b) by 0 days.

(21) Appl. No.: 10/223,755

(22) Filed: Aug. 21, 2002

(51) Int. Cl.$^7$ ................................................ A47J 37/00
(52) U.S. Cl. ......................... 99/421 H; 99/419; 99/427
(58) Field of Search .......................... 99/326–333, 339, 99/340, 400, 401, 419–421 V, 426, 427, 444–450, 451, 473–476; 126/41 R, 25 R, 9 R; 219/400, 401, 385, 386

(56) References Cited

U.S. PATENT DOCUMENTS

| 3,058,414 | A | * | 10/1962 | Armstrong | 99/419 X |
| 4,483,241 | A | * | 11/1984 | Vaughn | 99/421 H |
| 5,970,854 | A | * | 10/1999 | Tsai | 99/421 H |
| 6,009,797 | A | * | 1/2000 | Lin | 99/421 H |
| 6,079,322 | A | * | 6/2000 | Su | 99/427 X |
| 6,250,211 | B1 | * | 6/2001 | Gongwer | 99/340 |
| 6,343,544 | B1 | * | 2/2002 | Bellion | 99/421 H |
| 6,347,577 | B1 | * | 2/2002 | Harneit | 99/427 |
| 6,418,835 | B1 | * | 7/2002 | Lin | 99/446 X |
| 6,484,625 | B2 | * | 11/2002 | Waltman | 99/427 X |

* cited by examiner

Primary Examiner—Timothy F. Simone

(57) ABSTRACT

A rotisserie attachable skewer assembly for allowing a user to attach skewers to a rotisserie for barbequing food items. The rotisserie attachable skewer assembly includes a rotisserie including a shaft; and also includes a mounting bracket being fastened with a fastener to the shaft and including a hub member and a plurality of radial-extending arms being attached to the hub member; and further includes a plurality of skewers being detachably attached to the radial-extending arms.

5 Claims, 3 Drawing Sheets

ROTISSERIE ATTACHABLE SKEWER ASSEMBLY

BACKGROUND OF THE INVENTION

1. Field of the Invention

The present invention relates to rotisserie attachable skewers and more particularly pertains to a new rotisserie attachable skewer assembly for allowing a user to attach skewers to a rotisserie for barbequing food items.

2. Description of the Prior Art

The use of rotisserie attachable skewers is known in the prior art. More specifically, rotisserie attachable skewers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 3,387,555; U.S. Pat. No. 5,819,639; U.S. Pat. No. 4,112,832; U.S. Pat. No. 4,924,766; and U.S. Pat. No. Des. 336,593.

While these devices fulfill their respective, particular objectives and requirements, the aforementioned patents do not disclose a new rotisserie attachable skewer assembly. The prior art includes rotisseries having motors and shafts upon which the food items are placed and also having support prongs being mounted upon the shafts.

SUMMARY OF THE INVENTION

The general purpose of the present invention, which will be described subsequently in greater detail, is to provide a new rotisserie attachable skewer assembly which has many of the advantages of the rotisserie attachable skewers mentioned heretofore and many novel features that result in a new rotisserie attachable skewer assembly which is not anticipated, rendered obvious, suggested, or even implied by any of the prior art rotisserie attachable skewers, either alone or in any combination thereof. The present invention includes a rotisserie including a shaft; and also includes a mounting bracket being fastened with a fastener to the shaft and including a hub member and a plurality of radial-extending arms being attached to the hub member; and further includes a plurality of skewers being detachably attached to the radial-extending arms. None of the prior art includes skewers detachably mounted to a rotisserie.

There has thus been outlined, rather broadly, the more important features of the rotisserie attachable skewer assembly in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new rotisserie attachable skewer assembly which has many of the advantages of the rotisserie attachable skewers mentioned heretofore and many novel features that result in a new rotisserie attachable skewer assembly which is not anticipated, rendered obvious, suggested, or even implied by any of the prior art rotisserie attachable skewers, either alone or in any combination thereof.

Still another object of the present invention is to provide a new rotisserie attachable skewer assembly for allowing a user to attach skewers to a rotisserie for barbequing food items.

Still yet another object of the present invention is to provide a new rotisserie attachable skewer assembly that is easy and convenient to set up and use.

Even still another object of the present invention is to provide a new rotisserie attachable skewer assembly that saves the user considerable amount of time in barbequing multiple food items concurrently.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
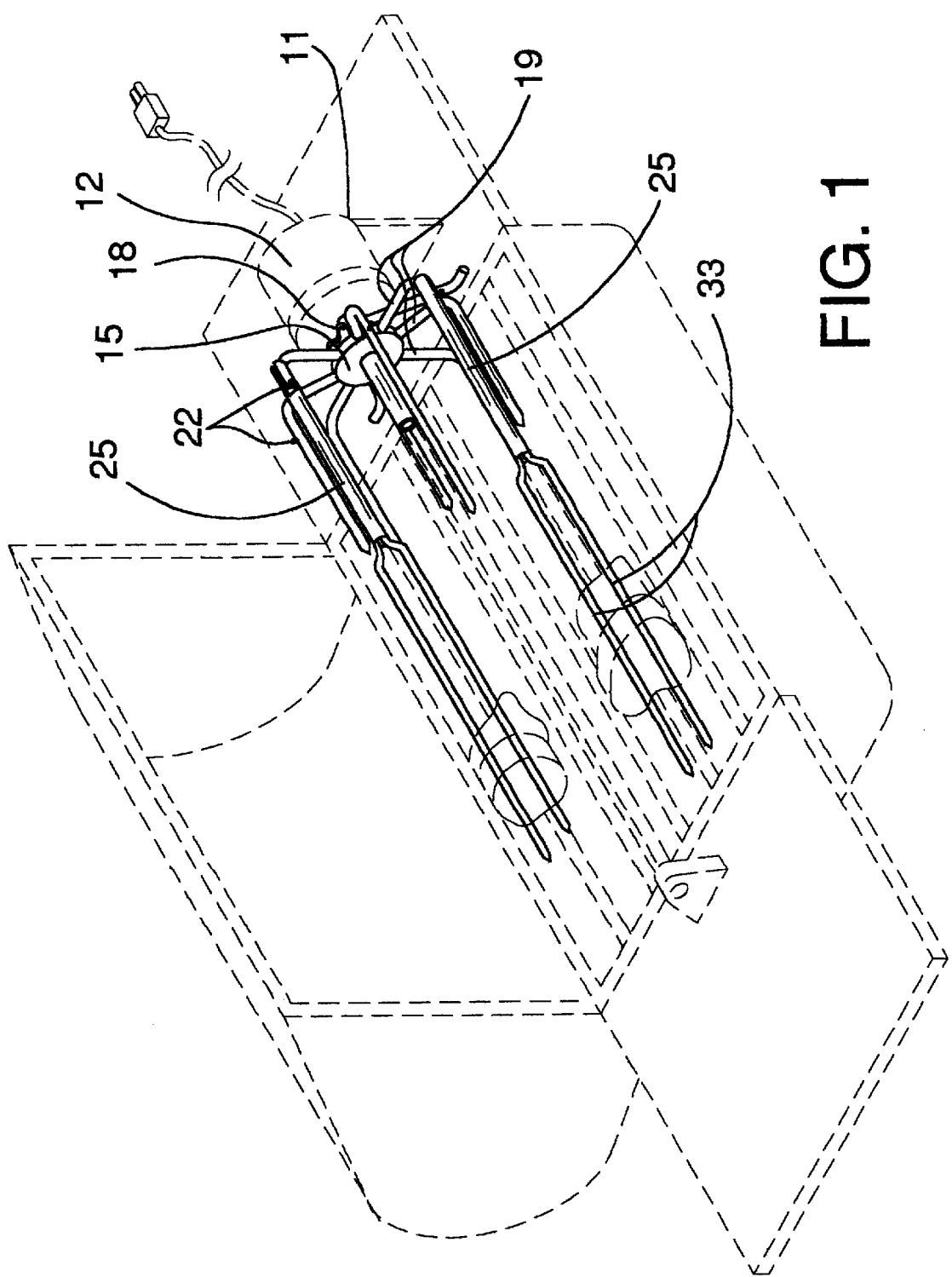
FIG. 1 is a perspective view of a new rotisserie attachable skewer assembly according to the present invention.
Figure 2:
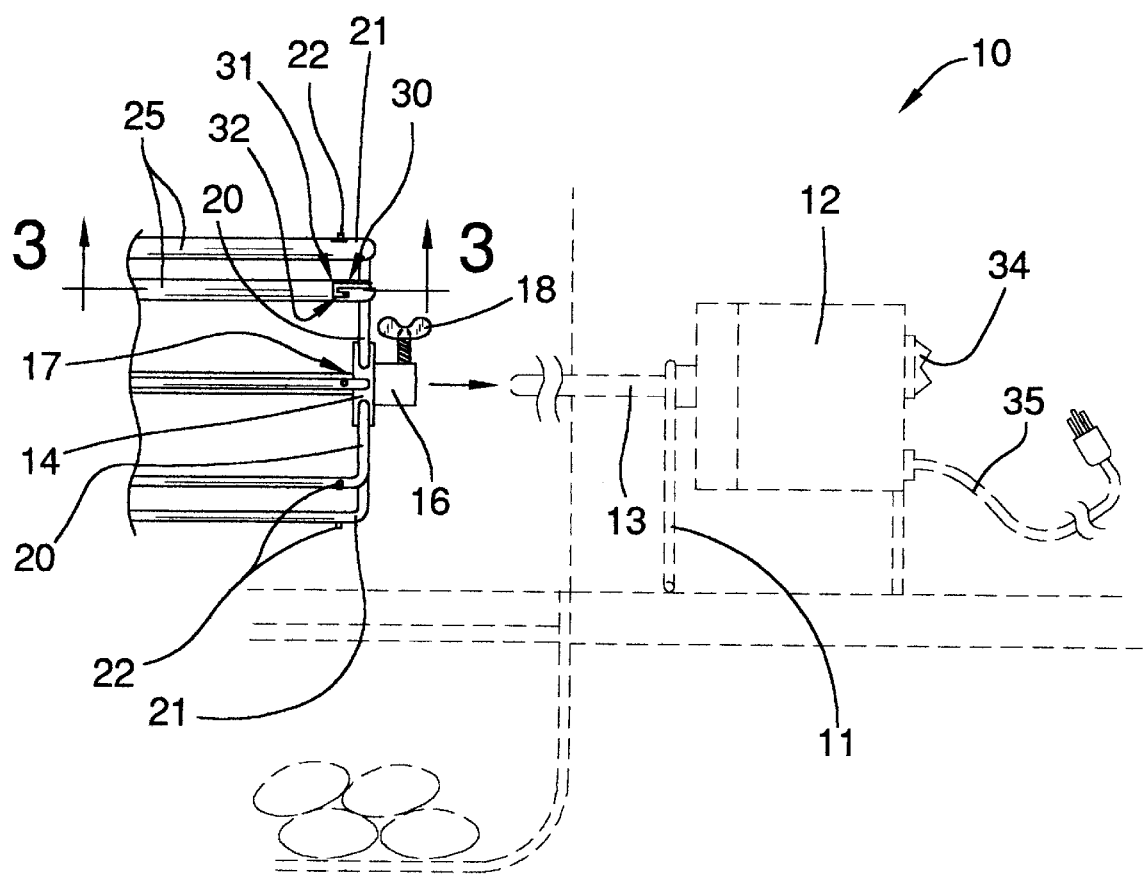
FIG. 2 is a side elevational view of the present invention.
Figure 3:
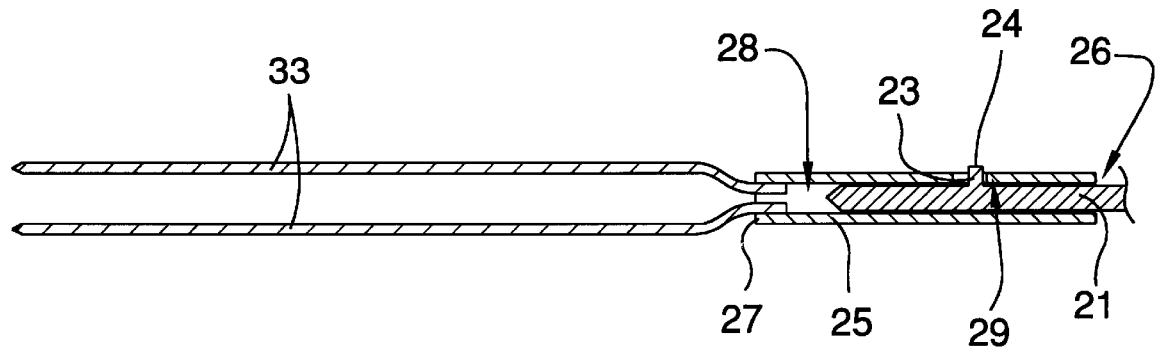
FIG. 3 is a cross-sectional view of a skewer of the present invention.
Figure 4:
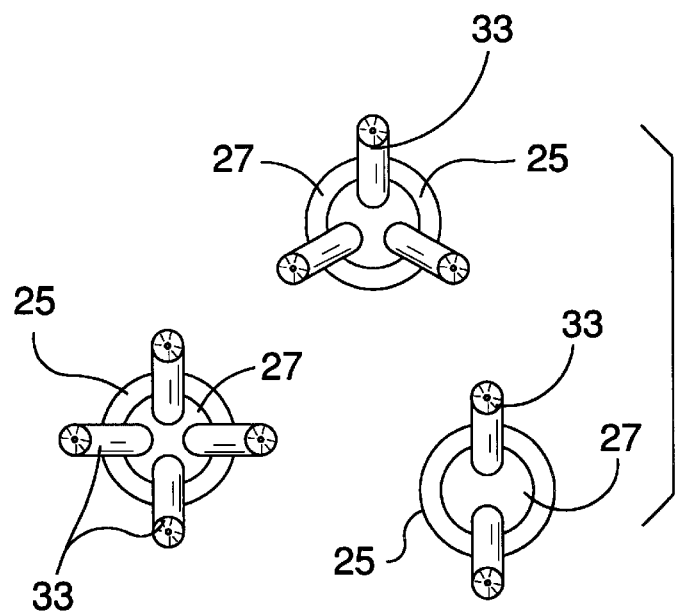
FIG. 4 are end elevational views of skewers of the present invention.

With reference now to the drawings, and in particular to FIGS. 1 through 4 thereof, a new rotisserie attachable skewer assembly embodying the principles and concepts of the present invention and generally designated by the reference numeral 10 will be described.

As best illustrated in FIGS. 1 through 4, the rotisserie attachable skewer assembly 10 generally comprises a conventional rotisserie 11 including a motor 12 and a shaft 13 rotatably and conventionally attached to the motor 12. The shaft 13 of the rotisserie 11 is multi-sided. A mounting bracket 14 is fastened with a fastener 18 to the shaft 13 and includes a hub member 15 and a plurality of radial-extending arms 19 being conventionally attached and welded to the hub member 15. The hub member 15 includes a disc-shaped member and a boss 16 being centrally and conventionally attached to a side of the disc-shaped member, and also includes a bore 17 being disposed through the disc-shaped member and the boss 16 and being multi-sided. The radial-extending arms 19 extend outwardly from a circumferential edge of the disc-shaped member. Each of the radial-extending arms 19 has an elongate first portion 20 being conventionally attached to the hub member 15, and also has an elongate second portion 21 which is disposed generally perpendicular to the elongate first portion 20, and further has a catch 22 being conventionally attached and welded to a side of the elongate second portion 21.

A plurality of skewers are detachably attached to the radial-extending arms 19. Each of the skewers includes a tubular support member 25 having an open first end 26 and a bore 28 disposed therein and being securely and removably mounted upon a respective one of the radial-extending arms 19, and also includes a plurality of elongate tines 33 having ends which are securely and conventionally attached at a second end 27 of the tubular support member 25. Each of the tubular support members 25 has an angled slot 29 being disposed through a wall and an edge thereof at the open front end 26 for receiving a respective one of the catches 22. Each of the angled slots 29 includes an axial main portion 30 extending through the edge of a respective tubular support member 25, and also includes a lateral intermediate portion 31, and further includes an axial end portion 32 with the angled slots 29 being generally J-shaped. Each of the catches 22 includes a stem portion 23 being conventionally attached to a respective one of the radial-extending arms 19, and also includes a flared cap portion 24 for engaging the side wall of a respective tubular support member 25.

In use, the user attaches the food items to the elongate tines 33, and conventionally energies the rotisserie 11 with a power switch 34 and with the motor 12 being plugged with a power cord 35 into a power source to rotate the elongate tines 33 and the food items above the spit for the barbequing thereof.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the rotisserie attachable skewer assembly. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A rotisserie attachable skewer assembly comprising:
   a rotisserie including a shaft rotatably attached to a motor and also including a power switch and a power cord for energizing said motor, said shaft of said rotisserie being multi-sided;
   a mounting bracket being fastened with a fastener to said shaft and including a hub member and a plurality of radial-extending arms being attached to said hub member, said hub member being a disc-shaped member and a boss being centrally attached to a side of said disc-shaped member, and also including a bore being disposed through said disc-shaped member and said boss and being multi-sided; and
   a plurality of skewers being detachably attached to said radial-extending arms, said radial-extending arms extending outwardly from a circumferential edge of said disc-shaped member; each of said radial-extending arms having an elongate first portion being attached to said hub member, and also having an elongate second portion which is disposed generally perpendicular to said elongate first portion, and further having a catch being attached to a side of said elongate second portion.

2. A rotisserie attachable skewer assembly as described in claim 1, wherein each of said skewers includes a tubular support member having an open first end and a bore disposed therein and being securely and removably mounted upon a respective one of said radial-extending arms, and also includes a plurality of elongate tines having ends which are securely attached at a second end of said tubular support member.

3. A rotisserie attachable skewer assembly as described in claim 2, wherein each of said tubular support members has an angled slot being disposed through a wall and an edge thereof at said open front end for receiving a respective one of said catches.

4. A rotisserie attachable skewer assembly as described in claim 3, wherein each of said angled slots includes an axial main portion extending through said edge of a respective said tubular support member, and also includes a lateral intermediate portion, and further includes an axial end portion, said angled slots being generally J-shaped.

5. A rotisserie attachable skewer assembly as described in claim 4, wherein each of said catches includes a stem portion being attached to a respective one of said radial-extending arms, and also includes a flared cap portion for engaging said side wall of a respective said tubular support member.

* * * * *